No. 777,192. PATENTED DEC. 13, 1904.
C. G. ETTE.
WASHER.
APPLICATION FILED SEPT. 12, 1904.
NO MODEL.
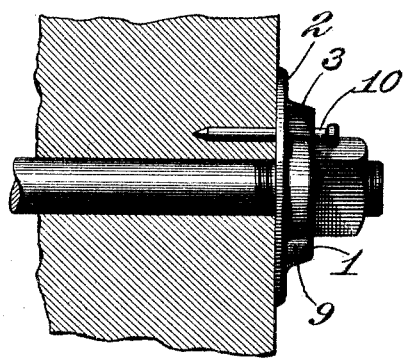
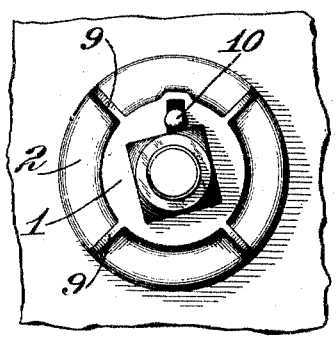
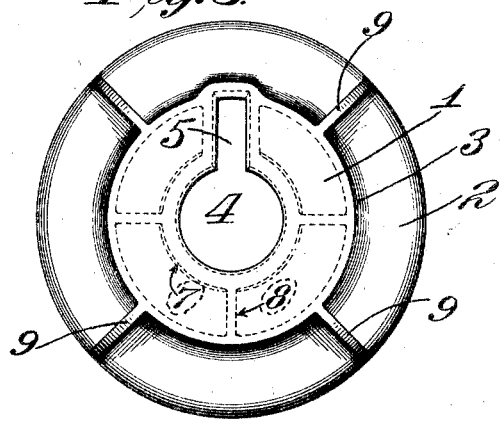
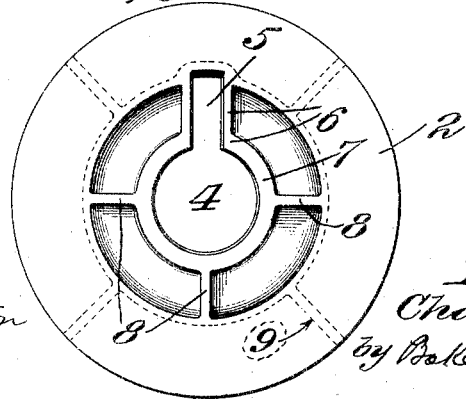
Witnesses:
G. A. Pennington
B. F. Funk
Inventor:
Charles G. Ette,
by Bakewell Cornwall
Attys.

No. 777,192.

Patented December 13, 1904.

UNITED STATES PATENT OFFICE.

CHARLES G. ETTE, OF ST. LOUIS, MISSOURI.

WASHER.

SPECIFICATION forming part of Letters Patent No. 777,192, dated December 13, 1904.

Application filed September 12, 1904. Serial No. 224,159. (No model.)

*To all whom it may concern:*

Be it known that I, CHARLES G. ETTE, a citizen of the United States, residing at St. Louis, Missouri, have invented a certain new and useful Improvement in Washers, of which the following is a full, clear, and exact description, such as will enable others skilled in the art to which it appertains to make and use the same, reference being had to the accompanying drawings, forming part of this specification, in which—

Figure 1 is a view, partly in section, showing my invention applied. Fig. 2 is a top plan view of the washer applied. Fig. 3 is a top plan view of the washer detached. Fig. 4 is a cross-sectional view of the washer, and Fig. 5 is a bottom plan view of the washer.

This invention relates to improvements in washers, and more particularly to washers used in connection with bolts or tie-rods employed in structures designed to withstand heavy strains, such as bridges, roofs, mines, and the like.

One of the objects of the present invention is to provide a washer which will be durable, light, and of sufficient strength to withstand strains to which an article of this class is subjected and having provision for locking the nut on its bolt or rod to prevent turning thereof.

Another object of the invention is to provide a washer which will be comparatively thin in cross-section and which may be made as a malleable casting possessing the maximum amount of strength with the minimum amount of weight, said washer being provided with a keyhole-opening having a flange surrounding the opening, so that a suitable nail or key can be inserted in the constricted portion of the opening to prevent turning of the nut on the bolt.

Referring now to the drawings, 1 designates the outer face-web, a base-web 2 being spaced from and in a parallel plane with relation to the face-web and connected by a connecting-web 3. The face-web 1 is provided with a keyhole-shaped opening having a relatively large portion 4 for the reception of the bolt or tie-rod and a relatively constricted portion 5 for the reception of the key. The opening 4 is concentric with the face-web 1, and the constricted portion or slot 5, which communicates with the enlarged portion 4 of the opening, extends from the edge portion 4 to a point slightly beyond the periphery of the web 1, or, in other words, the length of the constricted portion 5 of the opening is in excess of the distance between the edge of the enlarged portion 4 and the periphery of the web 1.

In order to brace the face-web 1 and provide a maximum strength for the washer, I have arranged on the under hollow side thereof an approximately keyhole-shaped flange 6, which surrounds the enlarged portion 4 and the constricted portion 5 of the opening. The configuration of this flange is such that the portion of the web 1 surrounding the opening is efficiently reinforced, so that the web will in no wise be weakened on account of the shape of the opening. If desired, the circular portion 7 of the flange 6 may be reinforced and connected to the connecting-web 3 by the radial ribs 8. Under certain conditions I may also desire to further reinforce the webs of the washer by means of the outer ribs 9, which are radially disposed and in staggered relation with the ribs 8.

It will be observed that all of the parts of this washer are of substantially the same thickness throughout, which enables the casting to be easily annealed, thus greatly adding to its durability and strength.

In applying the washer the threaded end of the tie-rod or bolt is projected through the portion 4 of the opening, and after the nut is applied a suitable key 10, such as a nail or other suitable implement, can be driven through the constricted portion 5 of the opening, so as to engage the side of the nut and prevent its turning. The length of the portion 5 of the opening insures considerable latitude in placing the key in the best position for preventing the movement of the nut, and inasmuch as the outer end of the portion 5 projects slightly beyond the periphery of the web 1 the key may be bent beyond the edge of the nut, if desired, for obvious reasons.

Attention is particularly directed to the manner in which the opening is made in the washer and the efficient manner in which it is reinforced, so that any liability of the web portion 1 being sprung due to the pressure caused by tightening the nut is avoided. The flanged portion 6 of the keyhole-shaped slot which projects from the smaller portion of said slot serves as a guide for the key 10, so that it will be directed straight into the wood, whereby it may be removed if occasion should demand. This guiding action is due to the fact that the inner edge of the flange 6, surrounding the edge of the keyhole-shaped opening, is flush with the base-web. So the flange 6 serves a dual purpose, in that it prevents springing of the web portion 1 as well as serving as a guide for the key.

Having thus described the invention, what is claimed as new, and desired to be secured by Letters Patent, is—

1. A washer having a face-web, a base-web, a web connecting the face-web and the base-web, the face-web being provided with a keyhole-shaped opening, and a flange surrounding the edge of the opening, the inner edge of said flange being flush with the base-web; substantially as described.

2. A washer comprising an outer face-web, a base-web spaced therefrom, a connecting-web for connecting the face-web and base-web, an approximately keyhole-shaped opening in the face-web, and an inner flange surrounding the edge of the opening and conforming to the shape thereof, the inner edge of said flange being flush with the base-web; substantially as described.

3. A washer having a keyhole-shaped opening with a flange entirely surrounding the opening and projecting at right angles thereto, the inner edge of said flange being flush with the base-web; substantially as described.

4. A washer comprising a base-web, a face-web of less diameter than the base-web and connected thereto, an opening in the face-web having a relatively large portion and a relatively constricted portion, and a reinforcing-flange surrounding the edges of the relatively large portion and relatively constricted portion, the inner edge of said flange being flush with the base-web; substantially as described.

5. A washer comprising a malleable casting of the same thickness throughout and having two webs connected together in one of which is an approximately keyhole-shaped opening, and a reinforcing-flange entirely surrounding the opening and extending to a point in the same plane as the plane of the other web, the inner edge of said flange being flush with the base-web; substantially as described.

6. A washer consisting of a malleable casting comprising an outer face-web and an inner base-web spaced apart, and a web connecting the two, the face-web having an approximately keyhole-shaped opening, and a flange surrounding the opening and of the same depth as the depth of the connecting-web; substantially as described.

7. A washer comprising an outer face-web, a connected base-web, the outer face-web having an approximately keyhole-shaped opening, the constricted portion of which extends slightly beyond the periphery of the outer face-web, and an edge flange entirely surrounding the opening; substantially as described.

8. A malleable washer comprising an outer face-web, an inner base-web, a web connecting the outer face-web and inner base-web, the outer face-web having an approximately keyhole-shaped opening, a reinforcing edge flange entirely surrounding the keyhole-shaped opening, and reinforcing-ribs connected to the reinforcing-flange and to the connecting-web for the outer face-web and inner base-web; substantially as described.

9. A washer having a face-web, a base-web, a web connecting the face-web and base-web, the face-web being provided with a keyhole-shaped opening, a flange surrounding the edge of the opening, said washer being constructed of non-yielding material; substantially as described.

In testimony whereof I hereunto affix my signature, in the presence of two witnesses, this 9th day of September, 1904.

CHARLES G. ETTE.

Witnesses:
B. F. FUNK,
CORA BADGER.